(12) United States Patent
Tullis et al.

(10) Patent No.: US 8,010,671 B2
(45) Date of Patent: Aug. 30, 2011

(54) METHOD AND SYSTEM FOR SHARED RESOURCE PROVIDERS

(75) Inventors: Steven Charles Tullis, Redmond, WA (US); William David Taylor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1086 days.

(21) Appl. No.: 11/117,841

(22) Filed: Apr. 29, 2005

(65) Prior Publication Data

US 2006/0253587 A1   Nov. 9, 2006

(51) Int. Cl.
G06F 15/173 (2006.01)
(52) U.S. Cl. ........................................................ 709/226
(58) Field of Classification Search .................. 709/218, 709/226
See application file for complete search history.

(56) References Cited

U.S. PATENT DOCUMENTS

| | | | | |
|---|---|---|---|---|
| 2003/0093527 A1* | 5/2003 | Rolia | ............................. | 709/226 |
| 2004/0117621 A1* | 6/2004 | Knight | ............................ | 713/165 |
| 2005/0049924 A1* | 3/2005 | DeBettencourt et al. | ........ | 705/21 |

OTHER PUBLICATIONS

Microsoft, WindowsNT Server, 1996.*
Stanek, William R., "Microsoft® IIS 6.0 Administrator's Pocket Consultant", Apr. 2, 2003, Microsoft Press, pp. 25-29, 36, 42, 44, 46.*

* cited by examiner

Primary Examiner — Andrew Caldwell
Assistant Examiner — Ryan J Jakovac
(74) Attorney, Agent, or Firm — Merchant & Gould P.C.

(57) ABSTRACT

The present invention facilitates the sharing of resources among multiple applications hosted on a server using shared resource providers. A shared resource provider is a logical grouping of shared services and resources to support the shared services, and is associated with one or more applications hosted on a computing device. The server fulfills requests for the shared services from the shared resource provider with which the requesting application is associated. Shared resource providers may be associated with many different applications, but each application may be associated with only one shared resource provider. The shared services may be configured for consumption by the applications at the server level, at the level of the shared resource provider, and the level of the application.

13 Claims, 10 Drawing Sheets

Fig. 6.

METHOD AND SYSTEM FOR SHARED RESOURCE PROVIDERS

TECHNICAL FIELD

In general, the present invention relates to sharing resources in a computing device and, more particularly, to sharing resources among applications hosted on a server.

BACKGROUND

In a typical server-based computing environment, systems are often deployed along organizational lines such that the server resources used to support one entity, e.g., one department or one customer, are separated from the resources to support other entities. This is often the case, for example, in a Web site hosting or application service provider environment, where multiple companies are hosted on a single set of hardware, and it is critical that each company's data is isolated from all of the other companies' data.

While the motivation to separate server resources in this manner is understandable, the separation itself can present other problems. One problem is that requiring separate resources can make it more difficult for system administrators to configure the system to keep pace with changes in the organization or the customers that the system supports. Another problem is that such arbitrary separations often lead to the inefficient use of resources, as more than one department or customer likely has similar needs for a specific resource. For instance, in the Web site hosting environment, customers often logically group like Web sites for which users ideally should have a similar experience when using a specific set of services (personalization, search, etc.). But having separate server resources interferes with being able to ensure similar user experiences with the services in an efficient and reliable manner.

From the technical perspective, other problems with separate resources exist. For example, Web-deployed systems typically consist of loosely-tied groups of application servers, each with its own set of features and functionality. In those instances where services are being logically tied together, the provision of those services should not depend on the existence of an end user focused Web site. Moreover, the provision of services must be secure and deployable in intranet, extranet, and internet environments, even when they are logically tied together.

SUMMARY

The foregoing problems with the prior state of the art are overcome by the principles of the present invention, which is directed toward methods, systems, computer program products, and data structures for sharing resources in a computing device. The present invention is further directed toward methods, systems, computer program products, and data structures to facilitate the sharing of resources among multiple applications hosted on the device.

According to one aspect of the invention, a shared resource provider ("SRP"), having at least one shared service and resource to support the shared service(s), is associated with one or more applications hosted on a computing device, where the one or more applications consumes the shared service(s) in the associated SRP.

According to another aspect of the invention, the SRP includes a Web service hosting facility within which the SRP can host Web services to provide any one or more of inter-server, inter-service, and inter-application communications for the shared service(s).

According to yet another aspect of the invention, the SRP is further associated with an administrator component hosted on the computing device, the administrator component including a central administrative site to facilitate a first level of administration of an SRP, the first level of administration including administration of actions which affect any SRP.

According to still another aspect of the invention, the administrator component further includes a separate SRP administrative site for each SRP to facilitate a second level of administration of an SRP, the second level of administration including administration of actions which affect only that SRP.

According to one other aspect of the invention, the one or more applications with which an SRP is associated may facilitate a third level of administration of an SRP, the third level of administration including administration of actions which affect only the consumption of a shared service(s) from an SRP by the one or more applications with which the SRP is associated.

In accordance with yet other aspects of the present invention, a computer-accessible medium for sharing resources in a computing device is provided, including a medium for storing data structures and computer-executable components for creating and administering an SRP associated with one or more applications hosted on a computing device. The data structures define the SRP, including the shared service(s), the resources to support the shared service(s), the Web service hosting facility, the administrator component, as well as the one or more applications with which the SRP is associated, in a manner that is generally consistent with the above-described systems and methods. Likewise, the computer-executable components are capable of performing actions generally consistent with the above-described systems and methods.

In accordance with still other aspects of the present invention, the above-described systems and methods advantageously allow isolation of shared resources in an SRP, as well as the delegation of administrative tasks to privileged end users in such a way that the privileged user may affect the consumption of shared resources in an SRP for which they are authorized, but cannot affect the consumption of shared resources in other SRPs for which they are not authorized.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4-9 are pictorial diagrams of exemplary interfaces that illustrate certain aspects of creating a shared resource provider system as diagrammed in FIG. 3, in accordance with an embodiment of the present invention.

DETAILED DESCRIPTION

When hosting multiple applications on one or more servers, such as hosting many different Web sites on a single server or a multiple server Web farm, the server(s) typically provide the applications with various types of services. For example, the server may provide the Web sites with services for performing searches of Web site content, generating user profiles, or tracking a document's life cycle. In the following discussion, a computing system that is suitable for implementing an improved method to facilitate sharing those services among multiple applications hosted on the server(s) in accordance with embodiments of the present invention is described in detail.

In general, the services that may be shared in an embodiment of the present invention include any services that are typically available for consumption across multiple applications hosted on the server(s). The shared services are typically offered by generalized server software deployed on the server(s) on which the applications are hosted. Such shared services are often consumed by many, if not all, of the applications or sites hosted on a particular server or Web farm.

In the discussion that follows, the use of the term shared services also refers to shared resources, and vice versa, where shared resources include any physical resource consumed by a shared service, such as a database repository that is accessed by multiple applications hosted on the server. Examples of shared resources may include, among others, the data repositories containing the search indices and user profiles used to support the search and user profile shared services already mentioned. In addition to the data repositories containing data specific to the provision of shared services, shared resources may also include various analytical tools. Some examples of server software commonly used to provide shared resources in this context are Microsoft's Windows Server and Office products.

Figure 1:
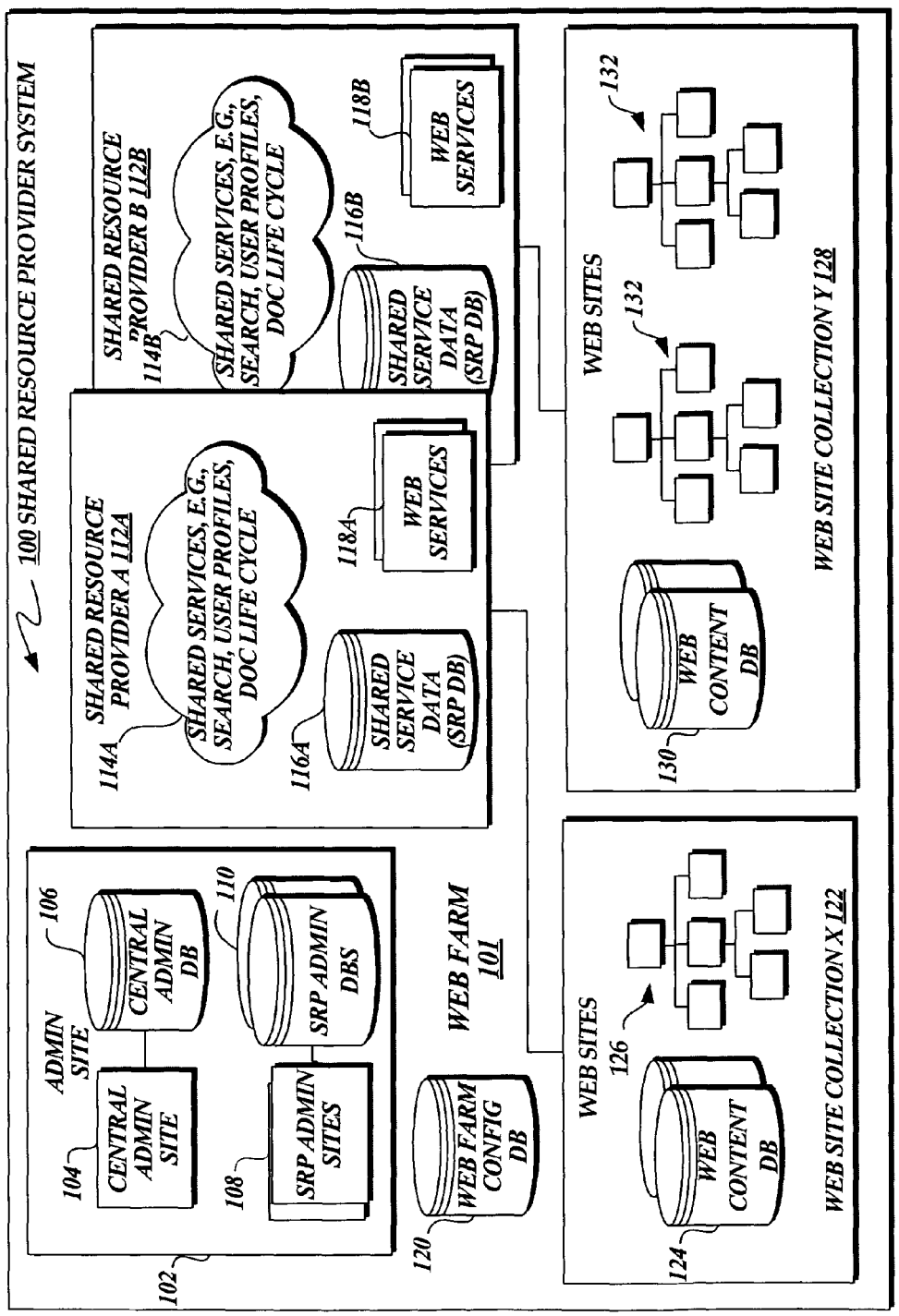
FIG. 1 is a block diagram depicting a shared resource provider system and one suitable operating environment in which resources may be shared in accordance with the present invention.

FIG. 1 is a block diagram depicting a shared resource provider system (SRP system) 100 and one suitable operating environment, in this case a Web farm 101 configured according to a Web farm configuration database 120, in which resources may be shared in accordance with the present invention. As shown, the SRP system 100 may include an administrative site 102, and one or more shared resource providers (SRP) 112A, 112B. Each SRP, e.g., SRP A 112A and SRP B 112B, comprises a logical grouping of shared resources, i.e., shared services and shared resources. For example, a logical grouping of shared services 114A and shared service data 116A, together with a set of SRP Web services 118A being hosted for the shared services 114A, comprise the components of each SRP. In one embodiment, for each SRP, e.g., SRP A 112A and SRP B 112B, the shared services 114A, 114B, and corresponding shared service data 116A, 116B, exist as a tightly bound cluster of services, i.e., each SRP's shared services 114A, 114B, will contain all of the available services in the current operating environment, in this case all of the available services in the Web farm 101. Any new shared services that became available after the creation of an SRP may be automatically added to each SRP's shared services 114A, 114B.

Alternatively, or in addition, the logical grouping of shared services 114A, 114B, and shared service data 116A, 116B, may comprise a subset of the available shared services in the current operating environment, and may vary from one SRP to another, but the underlying structure of the components remains the same across all SRPs.

In operation, each SRP, e.g., SRP A 112A and SRP B 112B, of a shared resource provider system 100, may be associated with one or more applications being hosted in the current operating environment, in this case the Web farm 101. In the illustrated embodiment, the one or more applications are Web sites that are members of a particular site collection 122, 128. For example, in the illustrated embodiment, SRP A 112A is associated with the Web site 126 in site collection X 122, whereas SRP B 112B is associated with the Web sites 132 in site collection Y 128. Each site collection 122, 128, may comprise one or more applications, such as a Web site, e.g., Web sites 126 in Web site collection X 122, where the applications are isolated from other applications in other site collections, e.g., Web sites 132 in site collection Y 128. Each site collection 122, 128 may further comprise one or more content databases, e.g., Web content databases 124 and Web content databases 130, that contain data specific to the Web sites 126, 132 that are present in the respective site collection.

Since the provision of services must be secure, even when those services are logically grouped into an SRP, the SRP system 100 supports three separate levels of SRP administration, including a first centralized level of administration performed above the level of the SRPs 112A, 112B, a second SRP level of administration performed at the level of an individual SRP, and a third site level of administration performed at the level of a site collection 122, 128. In one embodiment, the SRP system 100 supports the first and second levels of administration in the administrative site 102.

The administrative site 102 comprises a central administrative site 104 having access to a central administrative database 106, and one or more SRP administrative sites 108, each SRP administrative site corresponding to a particular SRP, e.g., SRP A 112A or SRP B 112B, and each having access to its own SRP administrative database 110.

In one embodiment, the central administrative site 104 is responsible for the first level of SRP administration. The first level of SRP administration is further subdivided into operational administration and service administration scenarios. In the operational administration scenario, the central administrative site 104 may be responsible for controlling the administration of actions which affect all of the available shared resources in the current operating environment, such as all of the available shared resources in Web farm 101, and not actions that affect just one or a subset of the available shared resources. The creation of an SRP, e.g., SRPA 112A, and SRPB 112B, and identifying the site collection with which an SRP is associated, e.g., Web site collection X 122 and/or Web site collection Y 128, are just two examples of the types of administrative actions which may affect all of the available shared resources in the current operating environment. The types of tasks performed in the operational administration scenario will be described in further detail with reference to FIG. 3 below.

Alternatively, or in addition, in the service administration scenario, the central administrative site 104 may be responsible for controlling the administration of actions which affect all instances of a specific shared service (and any resource that supports that shared service) in the current operating environment, e.g., all instances of a shared service in a farm. For example, the central administrative site 104 may be responsible for controlling the administration of server performance settings for shared resources for performing searches of Web site content. The types of tasks performed in the service administration scenario will be described in further detail with reference to FIG. 3 below.

In one embodiment, the one or more SRP administrative sites 108 are responsible for the second level of SRP administration. For example, each SRP administrative site 108 may be responsible for controlling the administration of actions which affect its associated SRP, e.g., SRP A 112A, or SRP B 112B. The administration of actions which affect a particular SRP are considered above the third site level of administration because the actions may affect multiple applications in all of the site collections that consume services from that particular SRP. The administration of actions which affect a particular SRP are also considered below the first central administrative level because they can be distributed to lower level administrators that are not authorized to administrate settings that could potentially affect the entire SRP system 100. For example, the authority to manage the search service property mappings may be delegated to a company's librarian. The librarian uses the appropriate SRP administrative site 108 for his or her company's SRP to make changes to the search service in that SRP. The changes may affect the behavior of the search functionality for users in all Web sites in the company's site collections that consume services from the company's SRP.

In one embodiment, the third level of SRP administration may be carried out in an application present in a site collection, e.g., in a Web site 126, 132 residing in a particular site collection 122, 128. For example, an available shared service consumed from an SRP may expose certain administrative settings on a per site collection basis. An application may change those administrative settings to suit the site collection's needs in such a way that a shared service may behave differently when consumed by applications in that site collection than when consumed by an application in another site collection, even though both applications reside in site collections that are consuming the shared service from the same SRP. Examples of such administrative settings may include settings that create scopes for a search service, or settings that establish permissions on an application registry method. The responsibility for the third level of SRP administration is held by the administrators of each particular site.

Figure 2:
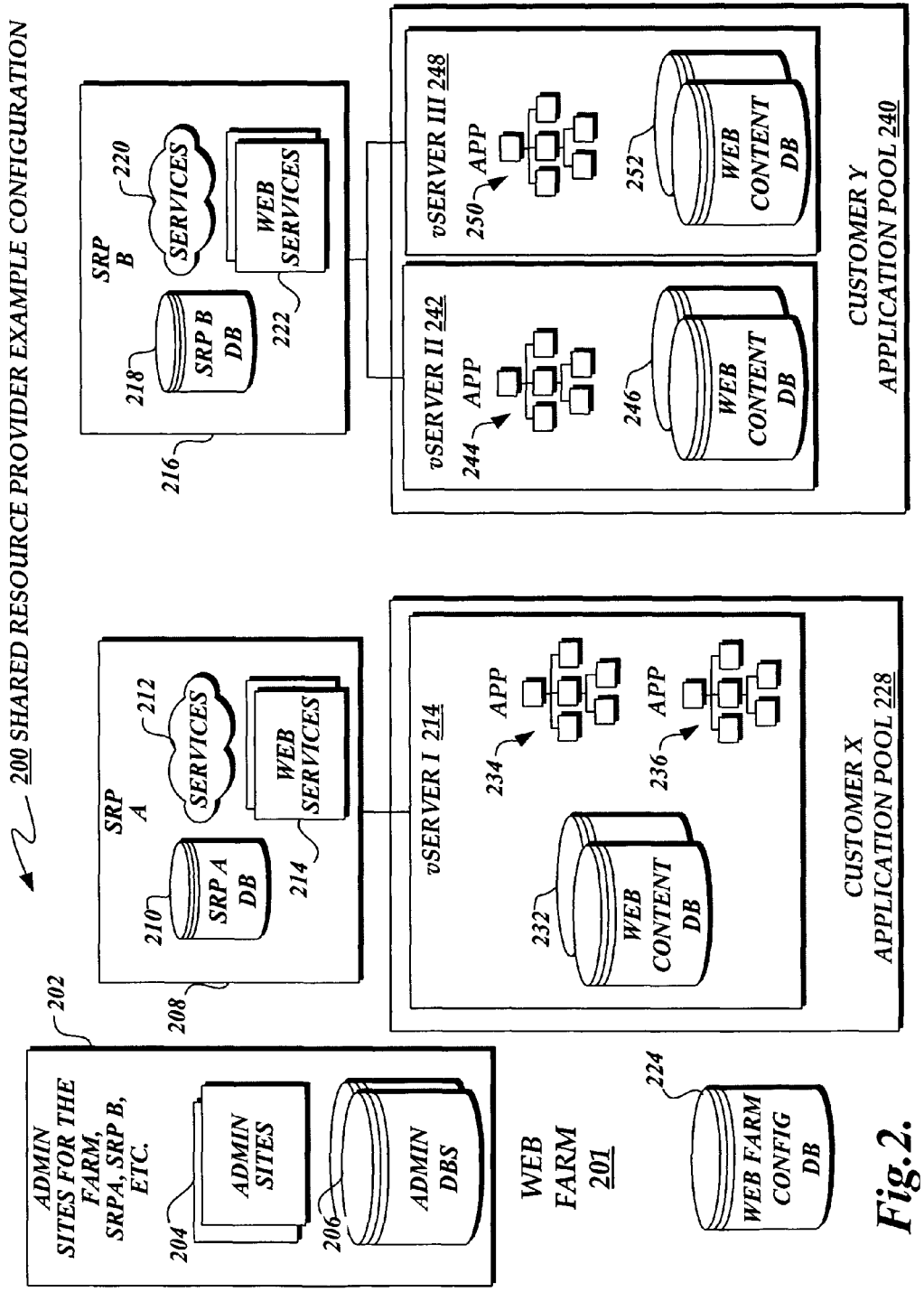
FIG. 2 is a depiction of an exemplary shared resource provider system for implementing an embodiment of the present invention.

FIG. 2 is a block diagram depicting a shared resource provider (SRP) example configuration 200 and one suitable operating environment, again a Web farm 201 configured according to a Web farm configuration database 224, in which resources may be shared in accordance with the present invention. As shown, the SRP example configuration 200 may include an administrator component 202 comprising multiple administrative sites 204 for the Web farm 201, including both a central administrative site and multiple SRP administrative sites as previously described with reference to FIG. 1. The SRP example configuration includes multiple SRPs, e.g., SRP A 208 and SRP B 216. Each SRP, comprise services 212, 220, databases 210, 218, and Web services 214, 222 components corresponding to those previously described with reference to FIG. 1.

In operation, SRP A 208 is associated with applications belonging to the Customer X application pool 228, in this case application 234 and application 236, and SRP B is associated with applications belonging to the Customer Y application pool 240, in this case application 244 and application 250. In the illustrated embodiment, the respective application pools 228 and 240 function as the site collections 122, 128, previously described with reference to FIG. 1, and are referred to here as application pools because they may be implemented using Windows Internet Information Services (IIS) application pools in order to isolate the applications belonging to the Customer X application pool 228 from the applications belonging to the Customer Y application pool 240. Of course, the use of IIS application pools is for purposes of illustration only, and it is understood that other ways of isolating applications may be used in other embodiments without departing from the scope of the claims that follow.

In the illustrated embodiment, all or a subset of the applications in a given application pool may be further configured into virtual servers, such as the virtual servers provided as part of the Microsoft Windows SharePoint Services (WSS) server products, referred to here as vServers. For example, all of the applications in the Customer X application pool 228, application 234 and application 236, are grouped with their corresponding content databases 232 into a single virtual server, vServer I 214. In contrast, each of the applications in the Customer Y application pool 240, application 244 and application 250, are grouped with their corresponding content databases 246 and 252, into their own separate virtual servers, vServer II 242 and vServer III 248. Of course, the use of WSS virtual servers is for purposes of illustration only, and it is understood that other ways of organizing applications into virtual servers may be used in other embodiments without departing from the scope of the claims that follow.

In one embodiment, each virtual server resides within, at most, a single application pool. Each application pool can host one or more virtual servers. Each virtual server may be associated with one and only one SRP. In addition, virtual servers residing within a given application pool may be associated with the same SRP or different SRPs. In the illustrated embodiment, vServer I 214 is associated with SRP A 208. Similarly, vServer II 242 and vServer III 248 are both associated with SRP B 216. As such, each application pool may be implicitly associated with one or more SRPs. In an alternate embodiment, each application pool may be explicitly associated with a particular SRP. In the illustrated embodiment, Customer X application pool 228 may be associated with SRP A 208, while Customer Y application pool 240 may be associated with SRP B 216.

In a typical embodiment, the services components 212 and 220 of SRP A 208 and SRP B 216 will contain all available services provided in the Web farm 201. Individual services, such as search services or application registry services, may be customized using the various levels of administration previously described with reference to FIG. 1. For example individual services may be customized at the third site collection level (here, the application pool level), by using WSS objects, or lists, to store site collection level information in the corresponding content databases. For example, in the Customer X application pool 228, the site collection level information may be stored in the Web content databases 232. Alternatively, or in addition, the site collection level information may be stored in the SRP databases. For example, in the Customer Y application pool 240, it may be desirable to store the site collection level information in the SRP B database 218.

In a typical embodiment, the first and second levels of administration may be used to customize individual services using the administrative sites 204 as previously described with reference to FIG. 1. In one embodiment, the information used to customize the shared services at the first level of administration may be stored in the Web farm configuration database 224. In one embodiment, the information used to customize the shared services at the second level of administration may be stored in the administration databases 206 associated with the respective administration sites 204. Alternatively, or in addition, the information used to customize the shared services at the second level of administration may be stored in the SRP database, 210, 218, associated with the SRP 208, 216, in which the customized services are contained In one embodiment, the administrative sites 204 and corresponding administrative databases 206 may also be organized into one or more virtual servers. In addition, the Web services 214 and 222 that form part of the corresponding SRPs, SRP A 208, and SRP B 216, may be implemented in one or more virtual directories residing in one or more virtual servers.

Figure 3:
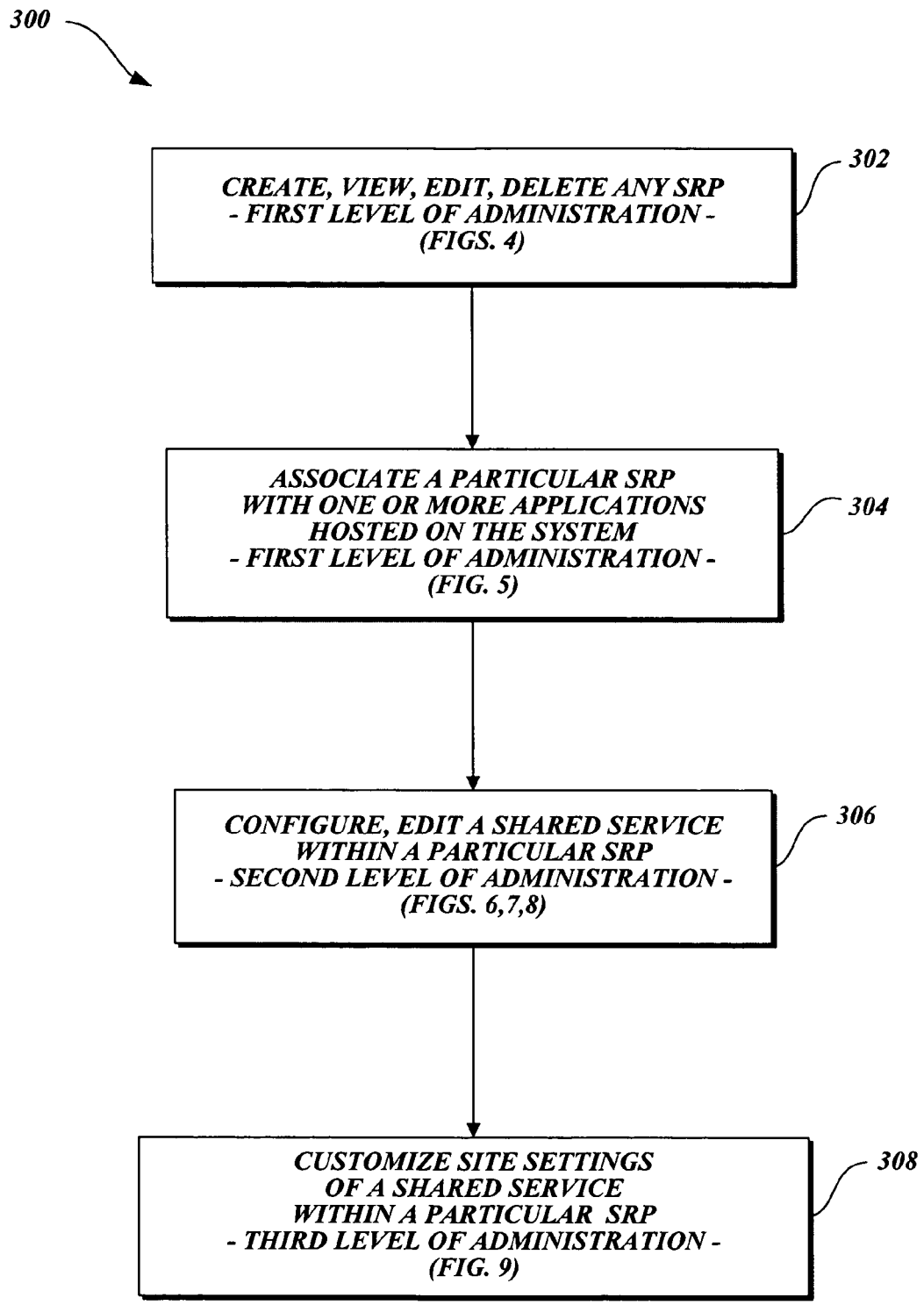
FIG. 3 is a flow diagram illustrating the logic performed for creating a shared resource provider system as illustrated in FIGS. 1 and 2, in accordance with an embodiment of the present invention.

FIG. 3 is a flow diagram illustrating certain aspects of a method 300 for creating a shared resource provider system 100 as described with reference to FIGS. 1 and 2, and in accordance with an embodiment of the present invention. In the description that follows, numerous references will be made to FIGS. 4-9, which represent pictorial diagrams of exemplary interfaces that further illustrate certain aspects of creating a shared resource provider system in accordance with an embodiment of the present invention.

Figure 4:
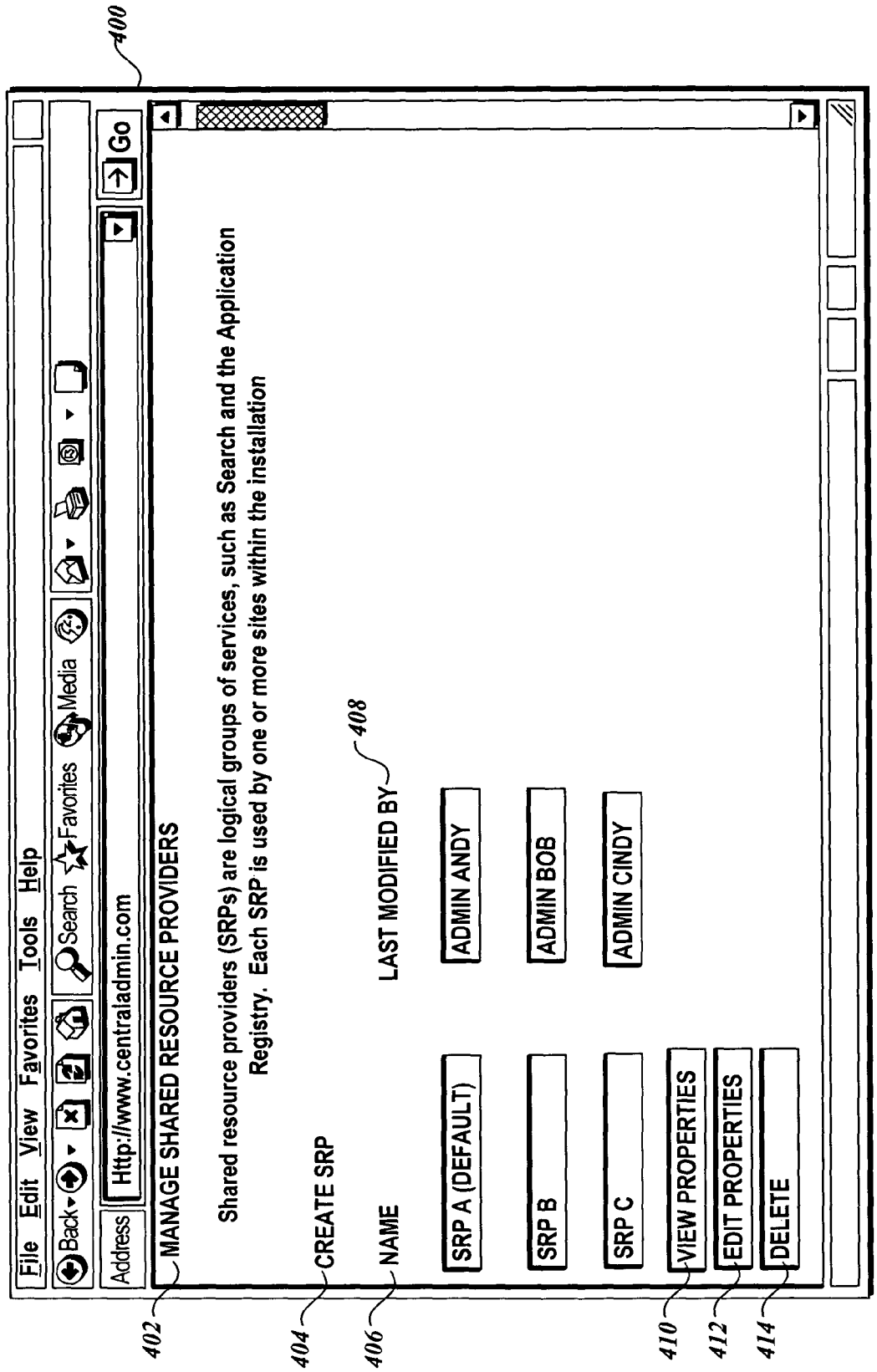
Figure 5:
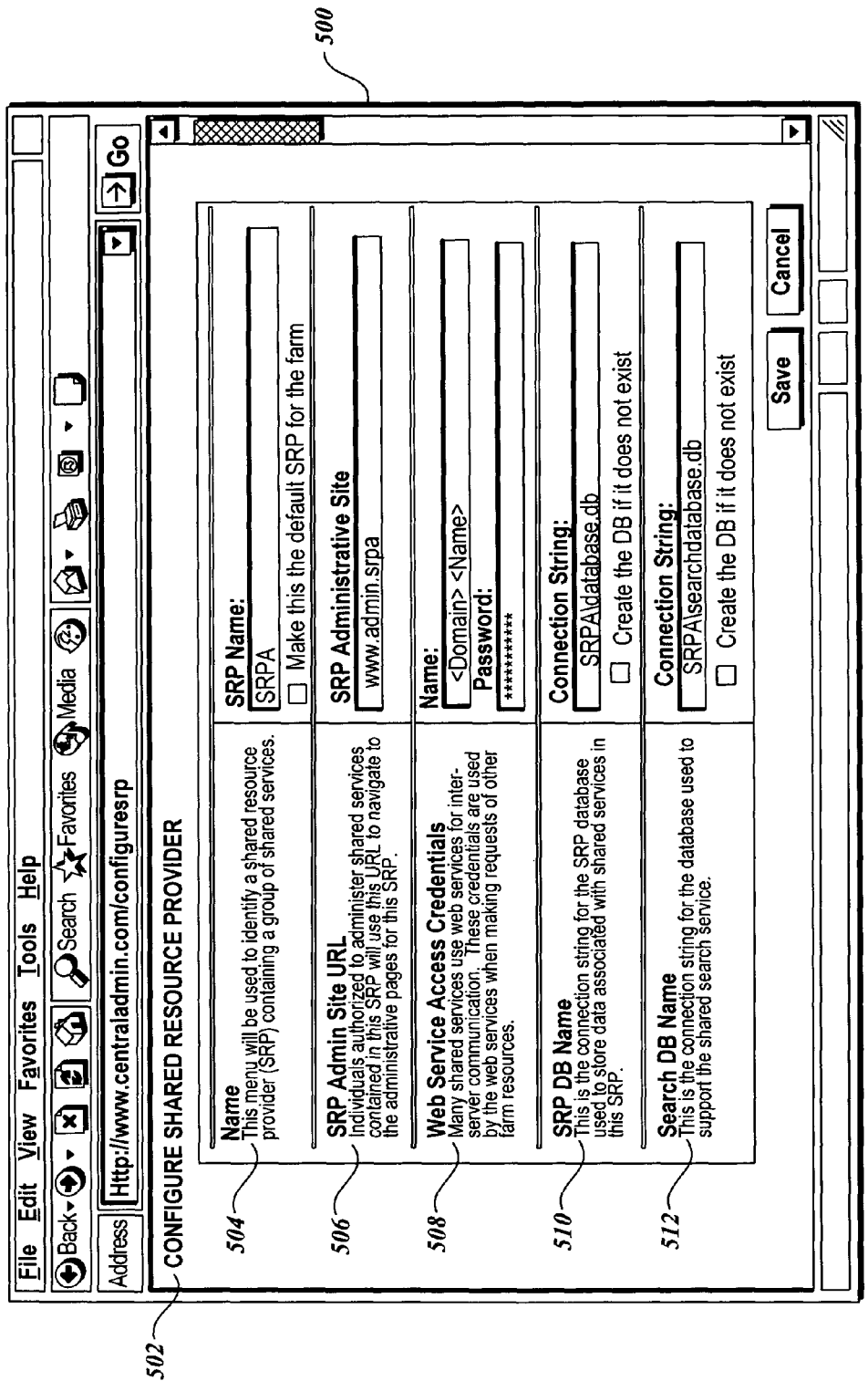

Beginning at process block 302, the method 300 begins with a process to create, view, edit, or delete any SRPs in accordance with the first level of administration in the SRP system 100. FIGS. 4-5 illustrate certain aspects of a user interface to facilitate the first level of administration, and will be discussed below.

Turning now to FIG. 4, a browser window 400 displays an exemplary manage shared resource providers page 402 to facilitate creating and managing SRPs at the first level of administration provided by the central administration site 104 previously described with reference to FIG. 1. For example, the manage SRP page 402 provides a create SRP link 404 that may be activated to transfer control to a default page provided by a default SRP administrative site (i.e., the second level of administration) such as one of the SRP administrative sites 108 previously described with reference to FIG. 1.

In one embodiment, the manage SRP page 402 further provides a display of the current SRPs that have already been created in the SRP system 100. For example, in the illustrated embodiment, beneath the Name caption 406, there are three SRPs listed, SRP A, SRP B, and SRP C. Next to each of the listed SRPs is displayed the name of the administrator that last modified the SRP under the caption heading Last Modified By 408. In this example Admin Andy last modified SRP A, Admin Bob last modified SRP B, and Admin Cindi last modified SRP C. In a typical embodiment, only one SRP may be the default SRP, and that SRP is preconfigured to include all available services in the current operating environment, as displayed in FIG. 8, described in further detail below. In this case, the default SRP is indicated to be SRP A.

In one embodiment, the manage SRP page 402 may include additional view properties 410, edit properties 412, and delete links 414 may be provided to transfer to another page to display and/or edit additional detail about a selected SRP, or to delete a selected SRP in accordance with the first level of administration of an SRP.

Turning now to FIG. 5, a browser window 500 displaying an exemplary configure shared resource provider page 502 that lists the various properties of an SRP that may be configured in accordance with the first level of administration in the SRP system 100. Those properties include, among others, the name of the SRP 504, the Uniform Record Locator (URL) 506 of the SRP admin site 108 (FIG. 1) that is associated with the SRP, the Web service access credentials 508 used for inter-server communication when using the Web services component 118A, 118B (FIG. 1) of the SRP, the SRP database name 510 that identifies the shared service data component, or SRP DB, 116A, 116B (FIG. 1) of the SRP, and in one embodiment, the search database name 512 that the SRP will use when performing searches. Of course, it is to be understood that the properties described herein are for ease of illustration only, and that some of these properties may be omitted, and other properties added, in a configure SRP page 502 without departing from the scope of the claims that follow.

Figure 6:
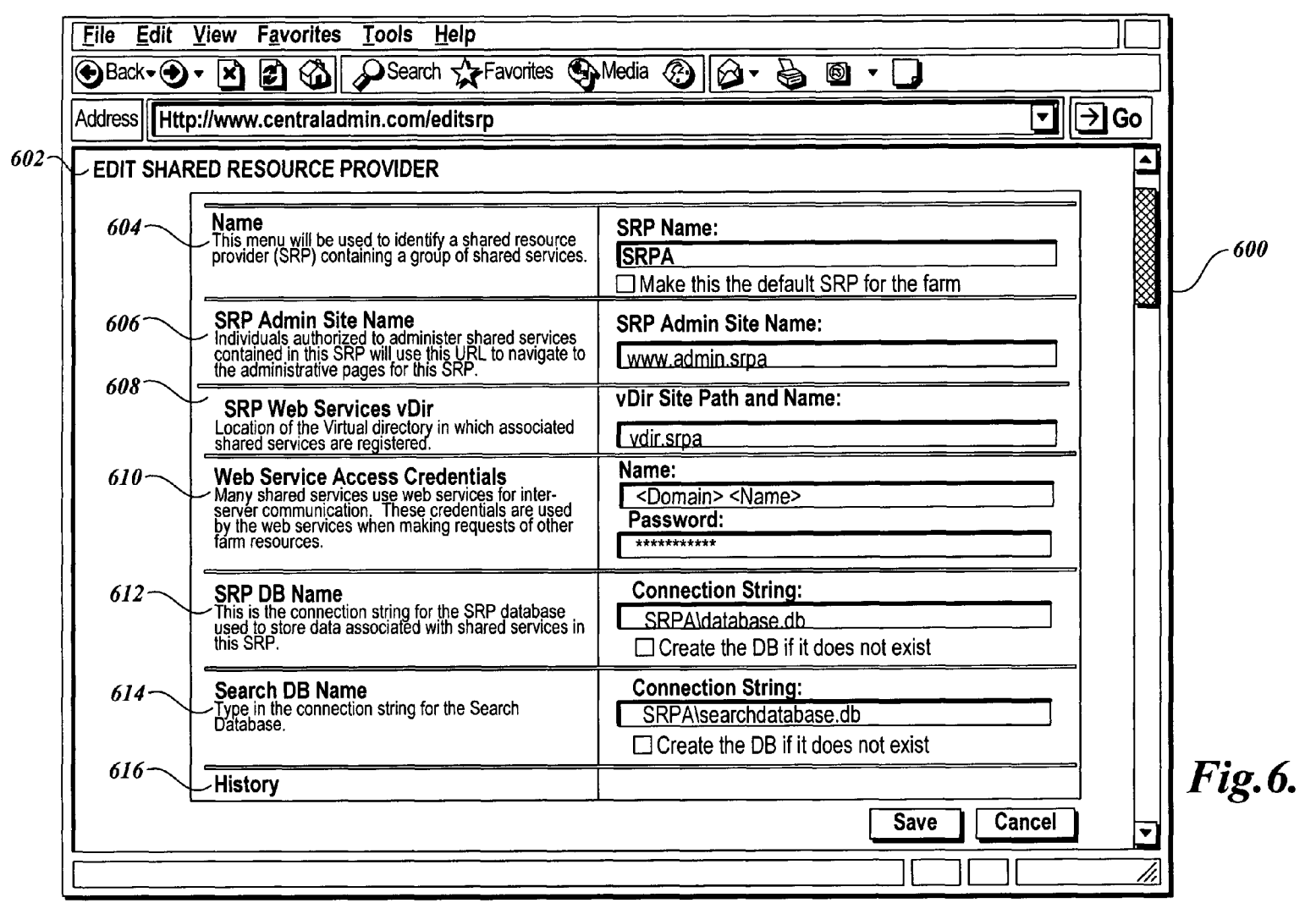

Turning now to FIG. 6, a browser window 600 displaying an exemplary edit shared resource provider page 602 that is similar to the configure SRP page 502 in FIG. 5, in that it also lists the various properties of an SRP that may be edited in accordance with the first level of administration in the SRP system 100. Those properties include, among others, the name of the SRP 604, the Uniform Record Locator (URL) 606 of the SRP admin site 108 (FIG. 1) that is associated with the SRP, the Web service virtual directory 608 where the Web services component 118A, 118B (FIG. 1) is registered, the Web service access credentials 610 used for inter-server communication when using the Web services component 118A, 118B (FIG. 1) of the SRP, the SRP database name 612 that identifies the shared service data component, or SRP DB, 116A, 116B (FIG. 1) of the SRP, and in one embodiment, the search database name 614 that the SRP will use when performing searches. In addition, the exemplary edit SRP page 602 may include a History link 616 that an SRP administrator can activate to transfer to an historical view (not shown) of the configuration of the SRP. Of course, it is to be understood that the properties and links described herein are for ease of illustration only, and that some of these properties and links may be omitted, and other properties and links added, in an edit SRP page 602 without departing from the scope of the claims that follow.

Figure 7:
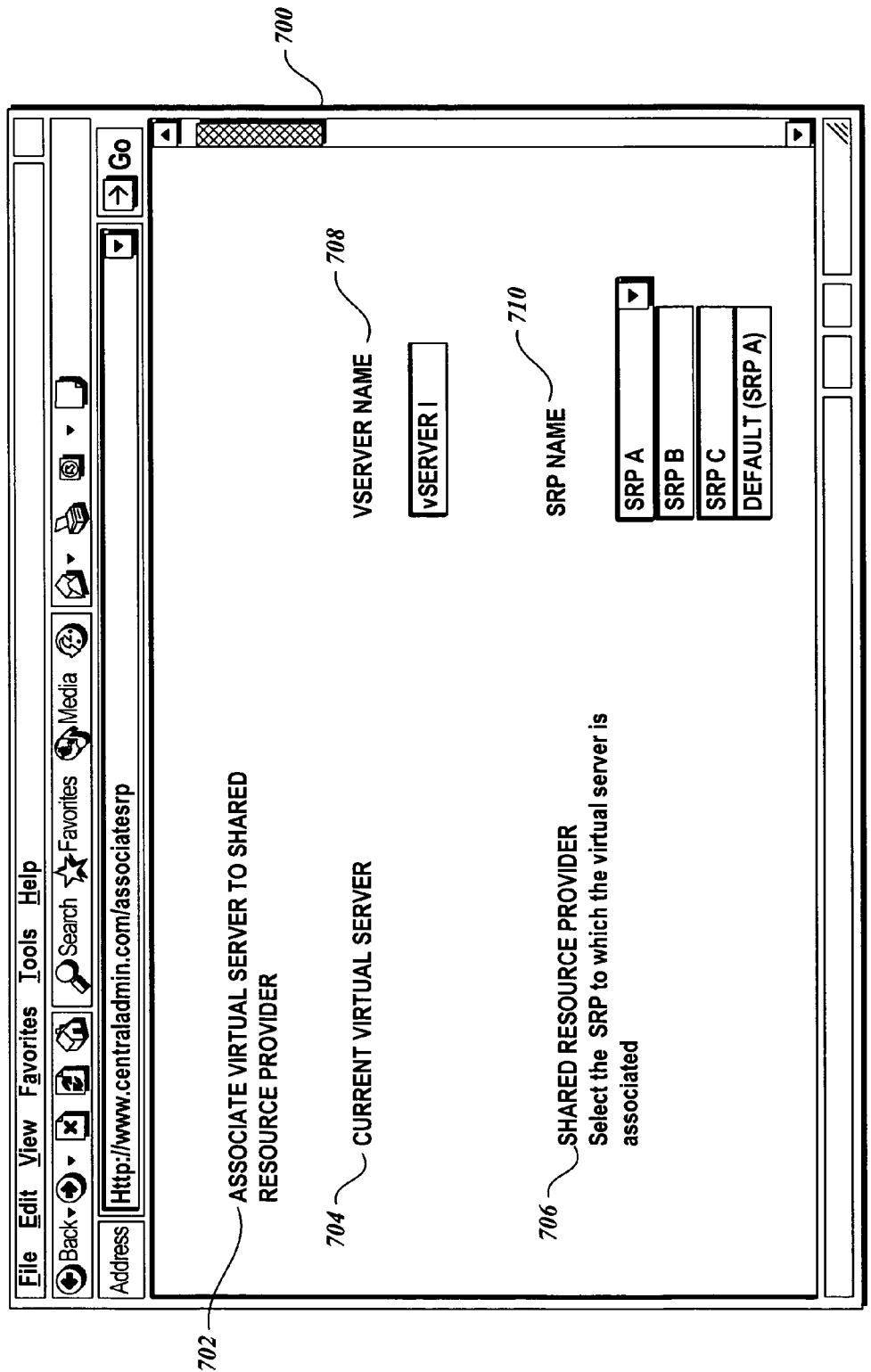

Returning now to FIG. 3, the method 300 continues with a process to associate an SRP with one or more applications hosted on the server system, e.g., Web sites hosted on a Web farm. FIG. 7 illustrates certain aspects of a user interface to facilitate the first level of administration, including the association of one or more applications with an SRP, and will be discussed below.

Turning now to FIG. 7, a browser window 700 displays an exemplary associate virtual server to shared resource provider page 702 to facilitate associating one or more applications or collections of applications with a particular SRP with at the first level of administration provided by the central administration site 104 previously described with reference to FIG. 1. In the illustrated embodiment, the collections of applications are application pools comprising Web site collections organized into one or more virtual servers, as previously described with reference to FIG. 2. Consequently, in the illustrated embodiment, the association between the one or more applications and the SRP is achieved by associating the virtual server within which the one or more applications are organized with a particular SRP. Of course other organizations of applications other than virtual servers, whether the applications are in site collections or application pools, may be used to associate an SRP with one or more applications without departing from the scope of the claims that follow.

In the illustrated embodiment, the exemplary associate virtual server page 702 includes caption headings CURRENT VIRTUAL SERVER 704, and VSERVER NAME 708, beneath which is listed the currently selected virtual server, in this case virtual server I. Beneath these caption headings appear a second set of caption headings SHARED RESOURCE PROVIDER 706 and SRP NAME 710, beneath which is listed a text selection box to facilitate the selection of the particular SRP with which the virtual server listed above, in this case virtual server I, is to be associated. As can be seen, there are three SRPs currently defined with which virtual server I may be associated, namely SRP A, SRP B, and SRP C, with SRP A being the default SRP with which the virtual server will be associated if no selection has been made. As previously described with reference to FIG. 2, more than one virtual server may be associated with a particular SRP. However, only one SRP may be associated with any one virtual server, and hence with any one application.

Figure 8:
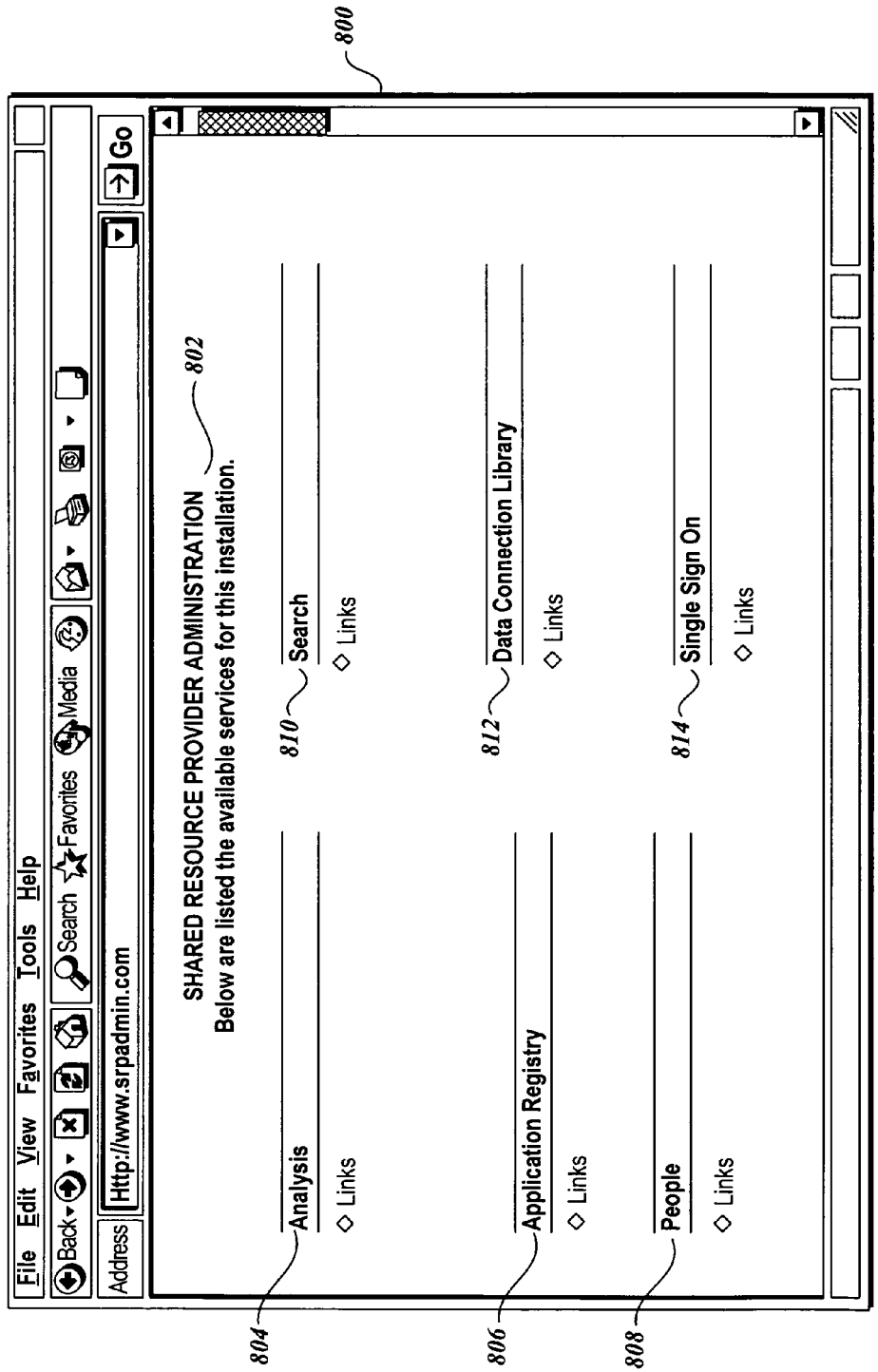

Returning now to FIG. 3, the method 300 continues with a process to configure or edit a particular SRP in accordance with the second level of administration in the SRP system 100. FIG. 8 illustrates certain aspects of a user interface to facilitate the second level of administration, and will be discussed below.

Turning now to FIG. 8, a browser window 800 displaying an exemplary shared resource provider administration page 802 lists all of the available services in the current installation. Those services include, among others, analytical tools 804, application registry services 806, people services 808, search services 810, data connection library services 812, and single sign on services 814. Of course, it should be understood that other types of services may be available depending on the installation and the particular implementation of the shared resource provider system 100. In a typical embodiment, all available services in the computing device are by default to be shared using SRPs. In one embodiment, the SRP administration page 802 may be generated as part of a user interface to the SRP administration site 108 previously described with reference to FIG. 1. The SRP administration page 802 facilitates the second level of administration for controlling the administration of actions that affect the shared services within a particular SRP.

Figure 9:
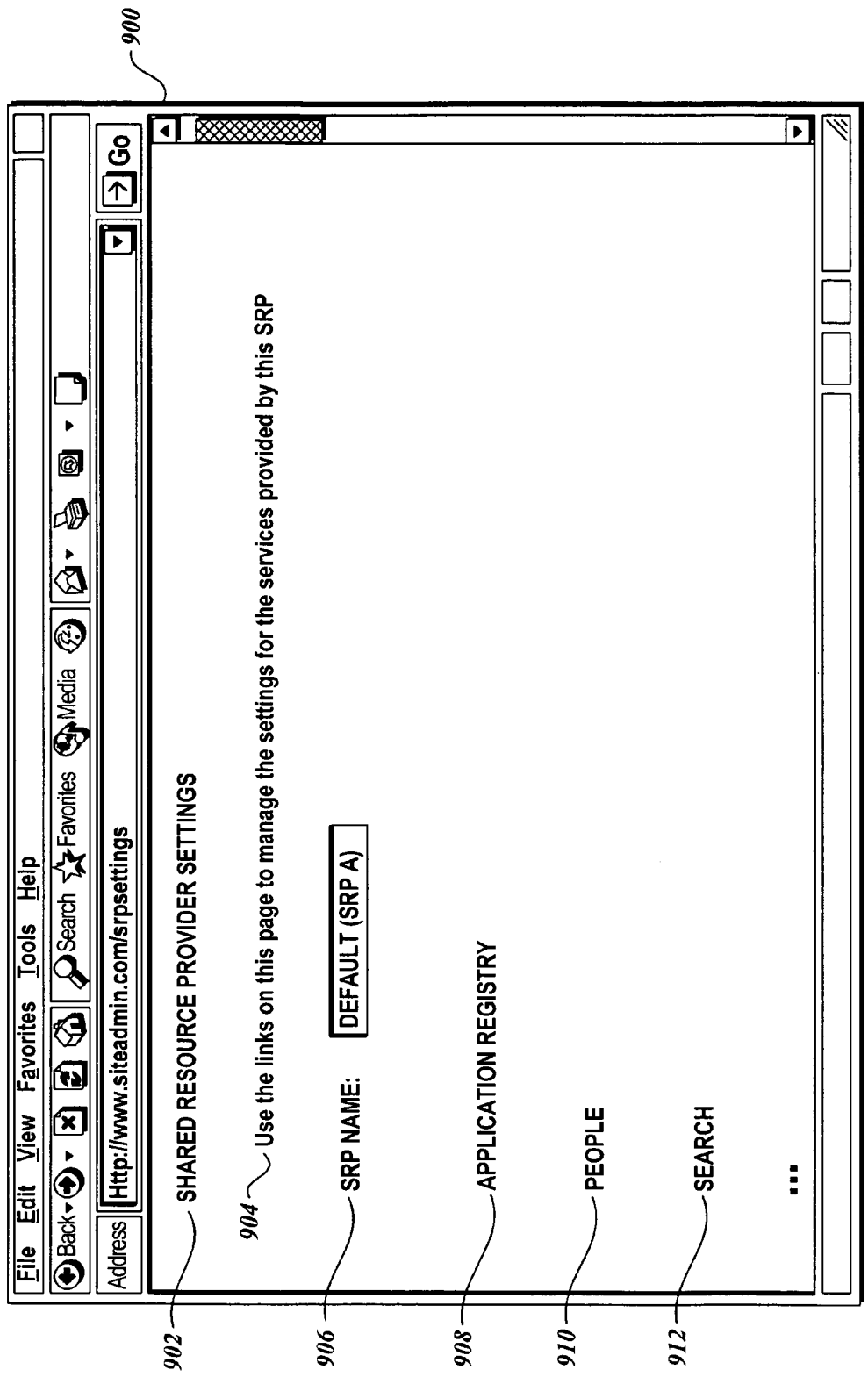

Returning now to FIG. 3, the method 300 continues with a process to customize site settings of a service in a particular SRP in accordance with the third level of administration in the SRP system 100. FIG. 9 illustrates certain aspects of a user interface to facilitate the third level of administration, and will be discussed below.

Turning now to FIG. 9, a browser window 900 displaying an exemplary shared resource provider settings page 902 that lists the various settings for the services provided by a particular SRP 904. The settings that are listed will correspond to whatever settings the individual service administrators have chosen to expose or otherwise make available to site administrators to administer in accordance with the third level of administration in the SRP system 100. These settings are used by the site administrator to customize the behavior of a particular service for applications consuming that service as provided by the associated SRP as listed next to the caption SRP NAME 906, in this case the default SRP A. As such, the settings will affect the behavior of the service only for applications within the site collection or application pool (or within the virtual server) associated with the SRP.

In one embodiment, the settings of a service that may be managed in accordance with the third level of administration in the SRP system 100, include, among others, application registry settings 908, people settings 910, and search settings 912. Of course, it is to be understood that the settings described herein are for ease of illustration only, and that some of these settings may be omitted, and other settings added, in an SRP settings page 902 without departing from the scope of the claims that follow.

Figure 10:
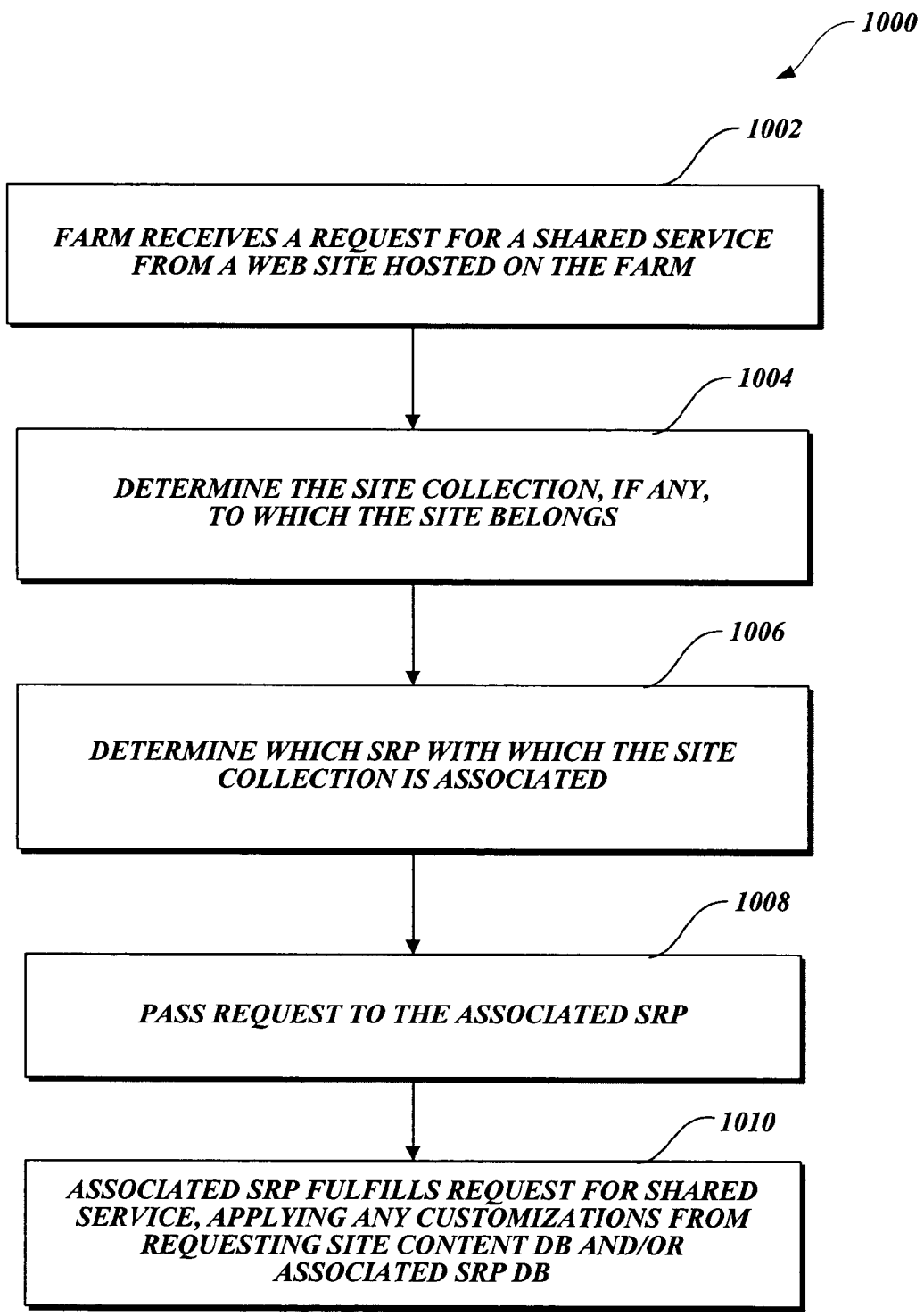
FIG. 10 is a flow diagram illustrating the logic performed for sharing resources using a shared resource provider system as illustrated in FIGS. 1-9 in accordance with an embodiment of the present invention.

FIG. 10 is a flow diagram illustrating the logic of a method 1000 performed for sharing resources using a shared resource provider system as illustrated in FIGS. 1-9 in accordance with an embodiment of the present invention. Beginning at process block 1002, the method 1000 begins with a Web farm or other type of server system receiving a request for a shared service from an application, e.g., a Web site, hosted on the farm. At process 1004, the farm determines the site collection (or application pool, or virtual server) to which the application belongs, and further at process block 1006, determines which SRP is associated with the site collection (or application pool, or virtual server). Once the appropriate SRP has been determined, at process block 1008, the farm passes the request to the associated SRP so that the application can consume the requested shared service from that SRP. Finally, at process block 1010, the SRP fulfills the request for the shared service, applying any customizations from, for example, the requesting applications content database, e.g. Web content DB 124, 130 (FIG. 1), or from the shared service data SRP DB 116A, 116B, as a result of the configuration and customization of the SRP in accordance with the first, second, and third levels of administration, as previously described with reference to FIGS. 1-9.

The foregoing discussion has been intended to provide a brief, general description of a computing system suitable for implementing various features of the invention. Although described in the general context of a personal computer usable in a distributed computing environment, in which complementary tasks may be performed by remote computing devices linked together through a communication network, those skilled in the art will appreciate that the invention may be practiced with many other computer system configurations. For example, the invention may be practiced with a personal computer operating in a standalone environment, or with multiprocessor systems, minicomputers, mainframe computers, and the like. In addition, those skilled in the art will recognize that the invention may be practiced on other kinds of computing devices including laptop computers, tablet computers, personal digital assistants (PDAs), cellphones, game consoles, personal media devices, or any device upon which computer software or other digital content is installed.

For the sake of convenience, some of the description of the computing system suitable for implementing various features of the invention included references to the Windows operating system, and references to the Windows Server, Office, Internet Information Server, and SharePoint Services products. However, those skilled in the art will recognize that those references are only illustrative and do not serve to limit the general application of the invention. For example, the invention may be practiced in the context of other operating systems such as the LINUX or UNIX operating systems, and other general purpose server software.

Certain aspects of the invention have been described in terms of programs executed or accessed by an operating system in conjunction with a personal computer. However, those skilled in the art will recognize that those aspects also may be implemented in combination with various other types of program modules or data structures. Generally, program modules and data structures include routines, subroutines, programs, subprograms, methods, interfaces, processes, procedures, functions, components, schema, etc., that perform particular tasks or implement particular abstract data types.

The embodiments of the invention in which an exclusive property or privilege is claimed are defined as follows:

1. A method for sharing resources among applications hosted on a server, the method comprising:
    creating on the server a shared resource provider having shared resources, the shared resource provider being part of a shared resource provider system that includes a plurality of shared resource providers, wherein all the shared resource providers in the system are controlled at a centralized administrative site that supports a first level of administration, the central administrative site being separate from the server, the centralized administrative site having access to a central administrative database and at least one additional administrative site, each of the at least one additional administrative sites corresponding to a shared resource provider, each of the at least one additional administrative sites having access to a separate shared resource provider administrative database, the creation of the shared resource provider being performed at the central administrative site at the first level of administration, wherein the first level of administration controls controlling administration of actions that affect all of the shared resources available in the shared resource provider system, one of the actions implemented at the first level of administration controlling performance settings for shared resources for performing searches of web content;

associating one or more applications hosted on the server with the shared resource provider, one of the applications being a first application, the association of the one or more applications with the shared resource provider being performed at the first level of administration;

associating each of the at least one additional administrative sites with its corresponding shared resource provider administrative database, the association of the at least one additional administrative site with its corresponding shared resource provider administrative database being performed via a user interface at the centralized administrative site;

configuring the shared resources in the shared resource provider, the first application consuming the configured shared resources from the shared resource provider, the configuring of the shared resources in the shared resource provider being performed at a second level of administration, the second level of administration being at the level of the shared resource provider; and configuring the settings of one or more web sites associated with the shared resource provider, each of the one or more web sites being separate from the server, the configuration of the settings of the one or more web sites being performed at a third level of administration, the third level of administration being at the level of the one or more web sites, wherein, the first level of administration is performed above an individual shared resource provider level, the second level of administration is performed at the level of an individual shared resource provider and the third level of administration is performed below the level of an individual shared resource provider.

2. The method of claim 1, further comprising:
storing a configuration resulting from configuring the shared resources in a database associated with the shared resource provider.

3. The method of claim 1, further comprising:
associating a second application hosted on the server with the shared resource provider, the second application consuming the configured shared resources from the shared resource provider; and
customizing a configured shared service in the shared resource provider for consumption by the second application in a manner that is different from the consumption of the configured shared service by the first application.

4. The method of claim 3, further comprising storing a customized configuration resulting from customizing the configured shared service in a database associated with the second application.

5. The method of claim 1, wherein the shared resource provider has a Web service hosting facility for use by the configured shared resources.

6. The method of claim 1, wherein the shared resources includes shared services, the shared services including at least one of an application registry service, a people service, a search service, a data connection library service, a single sign on service, and an analytical tool, and further includes data specific to the shared services.

7. The method of claim 3, wherein the first and second applications are in a respective first and second virtual server, the first and second applications being Web sites hosted on the first and second virtual server.

8. The method of claim 3, wherein the first and second applications are isolated from one another in a respective first and second application pool.

9. A system for sharing resources, the system comprising:
a plurality of shared resource providers, the plurality of shared resource providers including a plurality of shared resources;
shared resources available for consumption by applications hosted on a server, the server being one of the shared resource providers;
a centralized level of administration, the centralized level of administration being provided at a centralized administrative site that is separate from the server, the centralized level of administration providing a first level of administration, the centralized level of administration having access to a central administrative database and at least one administrative site, the at least one administrative site being separate from the centralized administrative site, the at least one administrative site corresponding to a particular shared resource provider, the at least one additional administrative site having access to a separate shared resource provider administrative database, the at least one additional administrative site being associated with the shared resource provider administrative database via a user interface at the centralized administrative site, the at least one administrative site providing a second level of administration, the second level of administration permitting a lower level of authorization than the first level of administration;
a central administrator, providing the first level of administration, subdivided into an operational administration scenario, to control actions affecting all of the shared resources and a service administration scenario for controlling administration of actions that affect all instances of a specific one the shared resources, including actions to create at least one shared resource provider (SRP) having a set of the shared resources, and actions to associate an application hosted on the server with the SRP, one of the actions affecting all of the shared resources controlling performance settings for shared resources for performing searches of web content, the central administrator implementing the operational administration scenario and the service administration scenario for all shared resources in the system;
an SRP administrator, providing the second level of administration, to control actions affecting the set of shared resources in an SRP, including actions affecting the consumption of the shared resources from the SRP;
a processor to receive a request from the at least one of the applications hosted on the server to consume a shared resource, to determine the SRP with which the requesting application is associated, and to fulfill the request to consume the shared resource from the set of shared resources in the associated SRP; and a site administrator, providing a third level of administration, to control actions effecting a shared resource in the set of shared resources in an SRP, wherein the actions affecting the shared resource in the set of shared resources include actions affecting the consumption of the shared resource by the application with which the SRP is associated.

10. The system of claim 9, wherein the actions to associate an application with the SRP includes actions to associate a virtual server with the SRP, the virtual server hosting the application on the server, wherein requests from the applications hosted in the virtual server are fulfilled from the set of shared resources in the SRP with which the virtual server is associated.

11. The system of claim 9, wherein the actions to associate an application with the SRP includes actions to associate an application pool with the SRP, the application pool isolating the application from other applications hosted on the server, wherein requests from applications isolated in the application pool are fulfilled from the set of shared resources in the SRP with which the application pool is associated.

12. The system of claim 9, wherein the actions to associate an application with the SRP includes actions to associate a site collection with the SRP, the site collection collecting application Web sites hosted on the server, wherein requests from the application Web sites in the site collection are fulfilled from the set of shared resources in the SRP with which the site collection is associated.

13. The system of claim 9, wherein the shared resources include shared services and data specific to the shared services.

* * * * *